US012234523B2

(12) United States Patent
Kokufu et al.

(10) Patent No.: US 12,234,523 B2
(45) Date of Patent: Feb. 25, 2025

(54) GRAIN-ORIENTED ELECTRICAL STEEL SHEET WITH INSULATING FILM AND METHOD FOR MANUFACTURING THE SAME

(71) Applicant: JFE Steel Corporation, Tokyo (JP)

(72) Inventors: Karin Kokufu, Tokyo (JP); Makoto Watanabe, Tokyo (JP); Takashi Terashima, Tokyo (JP); Toshito Takamiya, Tokyo (JP)

(73) Assignee: JFE Steel Corporation, Tokyo (JP)

(*) Notice: Subject to any disclaimer, the term of this patent is extended or adjusted under 35 U.S.C. 154(b) by 7 days.

(21) Appl. No.: 17/801,020

(22) PCT Filed: Dec. 23, 2020

(86) PCT No.: PCT/JP2020/048273
§ 371 (c)(1),
(2) Date: Aug. 19, 2022

(87) PCT Pub. No.: WO2021/171766
PCT Pub. Date: Sep. 2, 2021

(65) Prior Publication Data
US 2023/0106127 A1 Apr. 6, 2023

(30) Foreign Application Priority Data
Feb. 28, 2020 (JP) ................................ 2020-033126

(51) Int. Cl.
*C21D 6/00* (2006.01)
*C21D 8/12* (2006.01)
(Continued)

(52) U.S. Cl.
CPC ........... *C21D 8/1283* (2013.01); *C21D 6/005* (2013.01); *C21D 6/008* (2013.01); *C21D 8/1222* (2013.01);
(Continued)

(58) Field of Classification Search
CPC .......... C21D 1/76; C21D 6/005; C21D 6/008; C21D 8/1222; C21D 8/1261;
(Continued)

(56) References Cited

U.S. PATENT DOCUMENTS

2004/0074565 A1* 4/2004 Hayakawa .......... H01F 1/14783 148/111
2015/0007908 A1* 1/2015 Watanabe ............ C21D 8/1272 148/111
2018/0230565 A1* 8/2018 Watanabe ................. H01F 1/18

FOREIGN PATENT DOCUMENTS

CN 101784698 A 7/2010
CN 105593393 A 5/2016
(Continued)

OTHER PUBLICATIONS

Extended European Search Report for European Application No. 20921957.5, dated May 26, 2023, 7 pages.
(Continued)

*Primary Examiner* — Humera N. Sheikh
*Assistant Examiner* — Kevin Ct Li
(74) *Attorney, Agent, or Firm* — Buchanan Ingersoll & Rooney PC

(57) ABSTRACT

A grain-oriented electrical steel sheet has a base film composed mainly of forsterite on a surface of the grain-oriented electrical steel sheet and an insulating film containing mainly silicate-phosphate glass which is formed on a surface of the base film, in which, by controlling concentrations of Sr, Ca, and Ba in the base film and the insulating film to have specified gradients, the adhesion property and film tension of the insulating film are improved.

3 Claims, 1 Drawing Sheet

(51) Int. Cl.

| | |
|---|---|
| ***C21D 9/46*** | (2006.01) |
| ***H01F 1/16*** | (2006.01) |
| *C22C 38/00* | (2006.01) |
| *C22C 38/02* | (2006.01) |
| *C22C 38/04* | (2006.01) |
| *C22C 38/06* | (2006.01) |

(52) U.S. Cl.
CPC ......... *C21D 8/1233* (2013.01); *C21D 8/1261* (2013.01); *C21D 9/46* (2013.01); *H01F 1/16* (2013.01); *C21D 2201/05* (2013.01); *C22C 38/001* (2013.01); *C22C 38/002* (2013.01); *C22C 38/02* (2013.01); *C22C 38/04* (2013.01); *C22C 38/06* (2013.01); *C22C 2202/02* (2013.01)

(58) Field of Classification Search
CPC ...... C21D 8/1272; C21D 8/1283; C21D 9/46; C21D 2201/05; C22C 38/001; C22C 38/002; C22C 38/02; C22C 38/04; C22C 38/06; C22C 2202/02; C23C 22/22; C23C 22/23; C23C 22/74; C23C 22/79; C23G 1/083; H01F 1/06

See application file for complete search history.

(56) References Cited

FOREIGN PATENT DOCUMENTS

| | | | | |
|---|---|---|---|---|
| CN | 107923046 | A | | 4/2018 |
| EP | 2182091 | A1 | | 5/2010 |
| EP | 3064607 | A1 | | 9/2016 |
| EP | 3346025 | A1 | | 7/2018 |
| JP | 54143737 | A | | 11/1979 |
| JP | 07207453 | A | | 8/1995 |
| JP | 09321486 | A | | 12/1997 |
| JP | 1171683 | A | | 3/1999 |
| JP | 2000169972 | A | | 6/2000 |
| JP | 2000169973 | A | | 6/2000 |
| JP | 2000178760 | A | | 6/2000 |
| JP | 2002129309 | A | | 5/2002 |
| JP | 2004076146 | A | | 3/2004 |
| JP | 2004332072 | A | * | 11/2004 |
| JP | 2006137971 | A | | 6/2006 |
| JP | 2008050676 | A | | 3/2008 |
| JP | 2011231368 | A | | 11/2011 |
| WO | 2013024874 | A1 | | 2/2013 |

OTHER PUBLICATIONS

International Search Report and Written Opinion for International Application No. PCT/JP2020/048273, dated Feb. 16, 2021, 6 pages.

Chinese Office Action for Application No. 202080097503.9, dated Oct. 31, 2023 with Concise Statement of Relevance of Office Action, 10 pages.

* cited by examiner

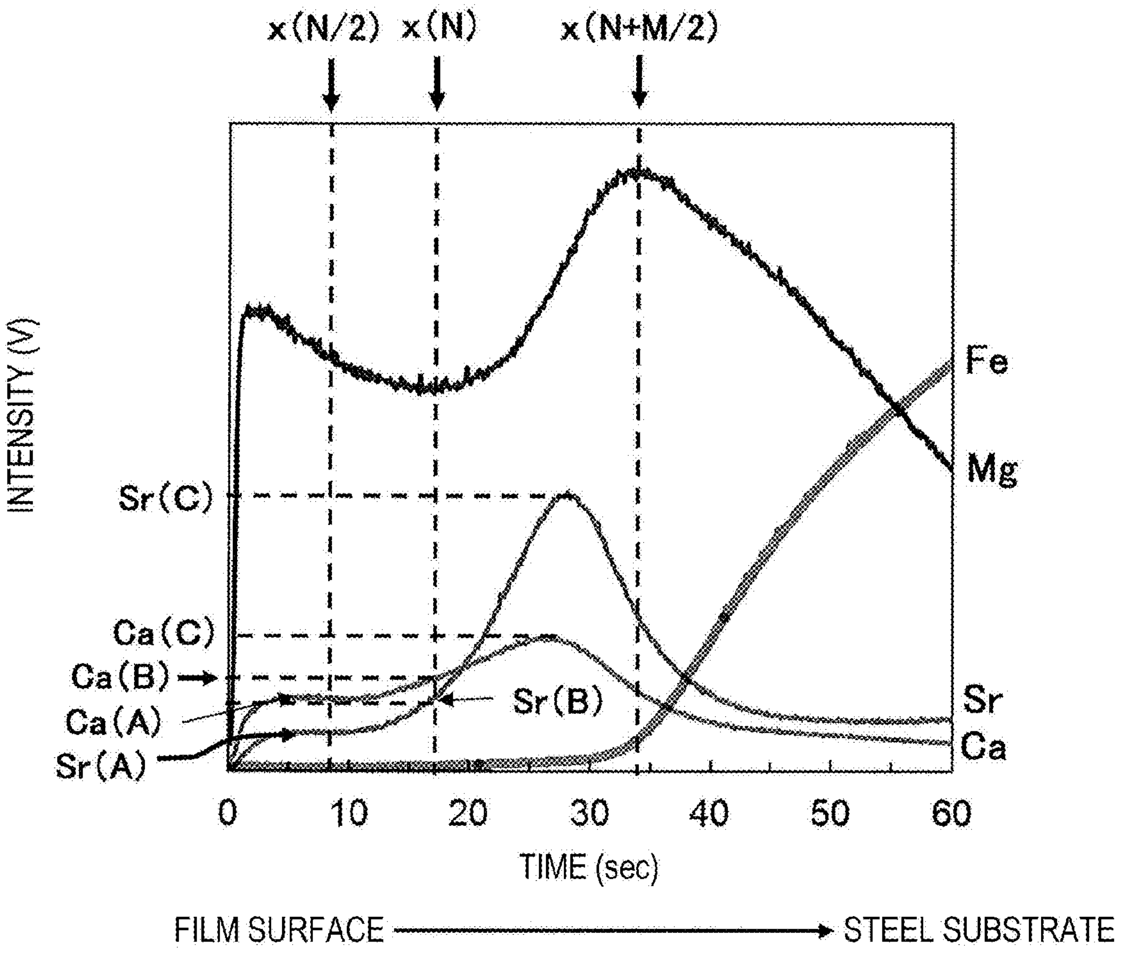
x(N/2)
x(N)
x(N+M/2)
INTENSITY (V)
Sr(C)
Ca(C)
Ca(B)
Ca(A)
Sr(A)
Sr(B)
Fe
Mg
Sr
Ca
0
10
20
30
40
50
60
TIME (sec)
FILM SURFACE
STEEL SUBSTRATE

GRAIN-ORIENTED ELECTRICAL STEEL SHEET WITH INSULATING FILM AND METHOD FOR MANUFACTURING THE SAME

CROSS REFERENCE TO RELATED APPLICATIONS

This is the U.S. National Phase application of PCT/JP2020/048273, filed Dec. 23, 2020 which claims priority to Japanese Patent Application No. 2020-033126, filed Feb. 28, 2020, the disclosures of these applications being incorporated herein by reference in their entireties for all purposes.

FIELD OF THE INVENTION

The present invention relates to a grain-oriented electrical steel sheet with an insulating film and a method for manufacturing the steel sheet and, in particular, to a grain-oriented electrical steel sheet with an insulating film which is excellent in terms of adhesion property of an insulating film and film tension and a method for manufacturing the steel sheet.

BACKGROUND OF THE INVENTION

A grain-oriented electrical steel sheet is a soft magnetic material which is used as an iron core material for transformers and electric generators and which has a crystalline texture in which a <001> orientation, which is an easily magnetized axis of iron, is highly oriented in the rolling direction of the steel sheet. Such a texture is formed through secondary recrystallization in which crystal grains with a (110)[001] orientation, which is called a Goss orientation, are preferentially grown into huge grains when secondary recrystallization annealing is performed in the manufacturing process of the grain-oriented electrical steel sheet.

Generally, a film is formed on the surface of a grain-oriented electrical steel sheet to provide an insulation capability, workability, a rust-prevention capability, and the like. Such a surface film is formed of a base film composed mainly of forsterite (hereinafter, also referred to as "forsterite film"), which is formed when finish annealing is performed, and a phosphate-based topcoat film formed on the base film. The forsterite film plays an important role in improving the adhesion property between the steel sheet (steel substrate) and the phosphate-based topcoat film.

Since such a phosphate-based topcoat film is formed at a high temperature and has a low thermal expansion coefficient, tension is applied to the steel sheet due to the difference in the thermal expansion coefficient between the steel sheet and the film when the temperature is decreased to room temperature, which results in the effect of decreasing iron loss. Therefore, such a film desirably applies as high tension as possible to a steel sheet in addition to providing other properties including an insulation capability.

When a grain-oriented electrical steel sheet with such a film on the surface thereof is subjected to work for manufacturing an iron core for a transformer or the like, in the case where such a film is poor in terms of adhesion property, heat resistance, or sliding performance, since peeling of the film occurs when working or stress-relief annealing is performed, it may be difficult to realize the essential performance of the film such as a tension-applying performance, and there may be a deterioration in usability due to the grain-oriented electrical steel sheets not being smoothly stacked in layers.

To achieve various film properties, various films have been proposed to date. For example, Patent Literature 1 proposes a technique regarding a grain-oriented electrical steel sheet with an insulating film which contains mainly a phosphate, a chromate, and a colloidal silica having a glass-transition temperature of 950° C. to 1200° C. and which has high tensile strength and an excellent adhesion property. In the case of the technique according to Patent Literature 1 described above, since the insulating film contains a chromate, which is a chromium compound, the insulating film is evaluated as being excellent in terms of film adhesion property. However, in the case where there is a large difference in thermal expansion coefficient between a base film and the insulating film, the insulating film may have an insufficient adhesion property of an insulating film with a forsterite film whose mechanical strength has been decreased due to pickling, and thus peeling may occur, which may result in a problem of insufficient tension being applied. Therefore, further improvement is necessary.

In addition, in response to growing awareness of environment conservation nowadays, there is a growing demand for a product containing no harmful materials, such as chromium, lead, or the like, and there is also a demand for developing a chromium-free film (a film containing no chromium) for a grain-oriented electrical steel sheet.

As an example of a technique to meet such a demand, Patent Literature 2 proposes a method for forming an insulating film utilizing a coating treatment solution composed of a colloidal silica, aluminum phosphate, boric acid, and a sulfate.

Moreover, as an example of a method for forming a chromium-free insulating film, Patent Literature 3 discloses a method in which, instead of a chromium compound, a boron compound is added to a coating treatment solution, and Patent Literature 4 discloses a method in which a colloidal oxide material is added to a coating treatment solution. In addition, Patent Literature 5 discloses a technique in which a metal organic acid salt is added to a coating treatment solution. However, since the adhesion property of the formed insulating films is not evaluated in Patent Literature 3 to Patent Literature 5, it is presumed that the adhesion property of the insulating films remains at a conventional level. Therefore, in the case of the insulating films disclosed in Patent Literature 3 to Patent Literature 5, there is room for improvement.

Regarding an insulating film excellent in terms of adhesion property, Patent Literature 6 discloses a method in which an aluminum borate-based insulating film that applies high tension is formed with good adhesion property by performing light pickling on a finish-annealed steel sheet having a finish annealing film formed mainly of a forsterite film, by forming a film composed mainly of a phosphate and having a coating weight of 0.5 g/m$^2$ or more and 3 g/m$^2$ or less per side or a film composed mainly of a phosphate and a colloidal silica and having a coating weight of 0.5 g/m$^2$ or more and 3 g/m$^2$ or less per side on the annealed steel sheet, by subsequently applying a coating solution composed mainly of alumina sol and borate, and by thereafter baking it. The technique according to Patent Literature 6 is intended to form an insulating film such as an aluminum borate-based insulating film that applies high tension with good adhesion property on a finish annealing film composed mainly of forsterite. In the case of the technique according to Patent Literature 6, the film composed mainly of a phosphate or a phosphate and a colloidal silica, which is formed as the first layer, is effective as a repairing material for the forsterite film whose mechanical strength has been decreased due to pickling. Such a film, which is formed as the first layer, is intended to repair the forsterite film, in which cracking has occurred due to etching, thereby improving the adhesion property of the aluminum borate-based insulating film, which is formed as the second layer.

However, in the case of the technique disclosed in Patent Literature 6 described above, since the second layer containing mainly aluminum borate-based is indispensable, and since an insulating film having a layered structure consisting of plural layers (first and second layers) is formed on the finish annealing film composed mainly of forsterite, there is an industrial problem of an increase in cost.

Patent Literature 7 discloses a technique for improving the film adhesion property of a forsterite film by controlling the distribution of Mg and Sr in the forsterite film (base film) to form a good forsterite film. In the case of the technique according to Patent Literature 7 described above, as a result of Sr oxides being formed in the underside of the forsterite film, there is a change in the morphology of the anchor part of the forsterite film, and thus there is an improvement in the adhesion property of the forsterite film. However, in the case of the technique disclosed in Patent Literature 7 described above, although there is an improvement in the adhesion property of the forsterite film with the steel substrate, when there is a large difference in thermal expansion coefficient between the forsterite film and the insulating film formed on the forsterite film, there may be a case where peeling occurs at the interface between the forsterite film and the insulating film.

PATENT LITERATURE

PTL 1: Japanese Unexamined Patent Application Publication No. 11-71683
PTL 2: Japanese Unexamined Patent Application Publication No. 54-143737
PTL 3: Japanese Unexamined Patent Application Publication No. 2000-169973
PTL 4: Japanese Unexamined Patent Application Publication No. 2000-169972
PTL 5: Japanese Unexamined Patent Application Publication No. 2000-178760
PTL 6: Japanese Unexamined Patent Application Publication No. 7-207453
PTL 7: Japanese Unexamined Patent Application Publication No. 2004-76146

SUMMARY OF THE INVENTION

Aspects of the present invention have been completed in view of the situation described above, and an object according to aspects of the present invention is to provide a grain-oriented electrical steel sheet with an insulating film which is excellent in terms of adhesion property of an insulating film and film tension.

In addition, an object according to aspects of the present invention is to provide a method for manufacturing a grain-oriented electrical steel sheet with an insulating film which is excellent in terms of adhesion property of an insulating film and film tension.

To solve the problems described above, the present inventors diligently conducted investigations to form a single-layer insulating film having both desired high film tension and a high adhesion property and, as a result, found that there may be a case where it is possible to achieve desired high film tension and a high adhesion property when at least one of Sr, Ca, and Ba is added to a base film. However, it was also found that, even when at least one of Sr, Ca, and Ba is added to a base film, there may be a case where it is not possible to achieve a satisfactory result. From the results of investigations regarding the reasons for this, it was found that it is possible to obtain an insulating film having good film tension and a good adhesion property by controlling Sr, Ca, and Ba, which are added to the base film, to be appropriately diffused also in an insulating film made of silicate-phosphate glass composed mainly of a metal phosphate and a colloidal silica.

That is, the subject matter according to aspects of the present invention is as follows.

[1] A grain-oriented electrical steel sheet with an insulating film, the steel sheet having a base film composed mainly of forsterite on a surface of a grain-oriented electrical steel sheet and an insulating film containing mainly silicate-phosphate glass which is formed on a surface of the base film, in which at least one of condition 1, condition 2, and condition 3 below is satisfied, and relational expressions $Sr(B) \geq Sr(A) \geq 0$, $Ca(B) \geq Ca(A) \geq 0$, and $Ba(B) \geq Ba(A) \geq 0$ are satisfied, where a thickness of the insulating film is defined as N and a thickness of the base film is defined as M, where, in a thickness direction from a surface of the insulating film, a position of the surface of the insulating film is defined as x(0), a central position of the thickness of the insulating film is defined as x(N/2), a position of an interface between the insulating film and the base film is defined as x(N), and a central position of the thickness of the base film is defined as x(N+M/2), where maximum values of a Sr concentration, a Ca concentration, and a Ba concentration in a region from the position x(0) to the position x(N/2) are defined as Sr(A), Ca(A), and Ba(A), respectively, and a Sr concentration, a Ca concentration, and a Ba concentration at the position x(N) are defined as Sr(B), Ca(B), and Ba(B), respectively, and where maximum values of a Sr concentration, a Ca concentration, and a Ba concentration in a thickness region formed by combining the insulating film and the base film are defined as Sr(C), Ca(C), and Ba(C), respectively, and positions at which the values Sr(C), Ca(C), and Ba(C) are taken are defined as x(Sr(C)), x(Ca(C)), and x(Ba(C)), respectively:

$$x(N/2) < x(Sr(C)) \leq x(N+M/2) \text{ and } Sr(C) > Sr(B) \quad \text{[Condition 1]}$$

$$x(N/2) < x(Ca(C)) \leq x(N+M/2) \text{ and } Ca(C) > Ca(B) \quad \text{[Condition 2]}$$

$$x(N/2) < x(Ba(C)) \leq x(N+M/2) \text{ and } Ba(C) > Ba(B) \quad \text{[Condition 3]}$$

[2] A method for manufacturing the grain-oriented electrical steel sheet with an insulating film according to item [1], the method including applying a treatment agent for forming an insulating film, the treatment agent containing mainly a metal phosphate and a colloidal silica and containing substantially no Sr, Ca, or Ba, to the surface of the grain-oriented electrical steel sheet having been subjected to finish annealing and having the base film composed mainly of forsterite on the surface thereof, the base film containing at least one of Sr, Ca, and Ba, thereafter heating the steel sheet at an average heating rate of 20° C./s or higher and 40° C./s or lower in an atmosphere having a dew-point temperature of −30° C. or higher and −15° C. or lower in a temperature range of 50° C. to 200° C., and thereafter baking the steel sheet at a baking temperature of 800° C. or higher and 1000° C. or lower to form the insulating film on the surface of the base film.

[3] The method for manufacturing the grain-oriented electrical steel sheet with an insulating film according to item [2], wherein the treatment agent for forming an insulating film contains a colloidal silica in an amount of 50 pts.mass to 200 pts.mass in terms of $SiO_2$ solid content with respect to a metal phosphate in an amount of 100 pts.mass in terms of solid content.

According to aspects of the present invention, it is possible to provide a grain-oriented electrical steel sheet with an insulating film which is excellent in terms of adhesion property of an insulating film and film tension.

BRIEF DESCRIPTION OF THE DRAWINGS

The FIGURE is an example of a graph illustrating the measurement results of the concentration distributions of Sr and Ca in Example of the present invention.

DETAILED DESCRIPTION OF EMBODIMENTS OF THE INVENTION

Hereafter, the experimental results which form the basis of aspects of the present invention will be described.

First, a sample was prepared as follows.

A slab for a silicon steel sheet having a chemical composition containing, by mass %, Si: 3.3%, C: 0.06%, Mn: 0.05%, S: 0.01%, sol.Al: 0.02%, and N: 0.01% was heated to a temperature of 1150° C. and thereafter subjected to hot rolling to obtain a hot rolled steel sheet having a thickness of 2.2 mm. The hot rolled steel sheet was subjected to annealing at a temperature of 1000° C. for one minute and thereafter subjected to cold rolling to obtain a cold rolled steel sheet having a final thickness of 0.23 mm. Subsequently, the cold rolled steel sheet was heated from room temperature to a temperature of 820° C. at a heating rate of 50° C./s and thereafter subjected to decarburization annealing at a temperature of 820° C. for 80 seconds in a wet atmosphere (containing $H_2$ in an amount of 50 vol % and $N_2$ in an amount of 50 vol % and having a dew-point temperature of 60° C.)

An annealing separator containing $TiO_2$ in an amount of 5 pts.mass and $SrSO_4$ in an amount of 6 pts.mass with respect to MgO in an amount of 100 pts.mass, which had been made into an aqueous slurry was applied to the obtained cold rolled steel sheet, which had been subjected to decarburization annealing, and thereafter dried. The steel sheet was subjected to finish annealing, in which after the dried steel sheet had been heated from a temperature of 300° C. to a temperature of 800° C. over 100 hours, the steel sheet was heated to a temperature of 1200° C. at a heating rate of 50° C./hr and thereafter subjected to annealing at a temperature of 1200° C. for 5 hours. An unreacted annealing separator was thereafter removed, and stress-relief annealing (at a temperature of 800° C. for 2 hours) was thereafter performed to prepare a grain-oriented electrical steel sheet having a base film composed mainly of forsterite and having been subjected to finish annealing (hereinafter, also referred to as "grain-oriented electrical steel sheet with a base film").

As described above, a grain-oriented electrical steel sheet with a base film in which Sr was contained in an amount of 0.0043 pts.mass with respect to the grain-oriented electrical steel sheet with a base film in an amount of 100 pts.mass (grain-oriented electrical steel sheet with a base film A) was obtained.

In addition, in the same manner as described above with the exception of using an annealing separator containing $TiO_2$ in an amount of 5 pts.mass and $CaSO_4$ in an amount of 5 pts.mass with respect to MgO in an amount of 100 pts.mass, instead of the annealing separator described above, a grain-oriented electrical steel sheet with a base film (grain-oriented electrical steel sheet with a base film B) was prepared. In the grain-oriented electrical steel sheet with a base film B, Ca was contained in an amount of 0.0043 pts.mass with respect to the grain-oriented electrical steel sheet with a base film in an amount of 100 pts.mass.

In addition, in the same manner as described above with the exception of using an annealing separator containing $TiO_2$ in an amount of 5 pts.mass and $BaSO_4$ in an amount of 9 pts.mass with respect to MgO in an amount of 100 pts.mass, instead of the annealing separator described above, a grain-oriented electrical steel sheet with a base film (grain-oriented electrical steel sheet with a base film C) was prepared. In the grain-oriented electrical steel sheet with a base film C, Ba was contained in an amount of 0.0066 pts.mass with respect to the grain-oriented electrical steel sheet with a base film in an amount of 100 pts.mass.

Subsequently, after light pickling in 5 mass % phosphoric acid had been performed on each of the grain-oriented electrical steel sheets with a base film A, B, and C described above, each of the treatment agents for forming an insulating film A to E described below was applied to the pickled steel sheet so that the coating weight was 8 g/m$^2$ on both sides in total of the steel sheet after having been baked, heating was thereafter performed in a temperature range of 50° C. to 200° C. in an atmosphere having the dew-point temperature (DP (° C.)) at the average heating rate (V (° C./s)) given in Table 1, and baking was thereafter performed at the baking temperature (T (° C.)) given in Table 1 to manufacture a grain-oriented electrical steel sheet with an insulating film.

(Treatment agent for forming an insulating film A) A treatment agent containing a colloidal silica in an amount of 80 pts.mass in terms of $SiO_2$ solid content and $CrO_3$ in an amount of 25 pts.mass with respect to magnesium primary phosphate in an amount of 100 pts.mass in terms of solid content.

(Treatment agent for forming an insulating film B) A treatment agent containing a colloidal silica in an amount of 80 pts.mass in terms of $SiO_2$ solid content and Mg nitrate in an amount of 50 pts.mass with respect to magnesium primary phosphate in an amount of 100 pts.mass in terms of solid content.

(Treatment agent for forming an insulating film C) A treatment agent containing a colloidal silica in an amount of 80 pts.mass in terms of $SiO_2$ solid content, Mg nitrate in an amount of 50 pts.mass, and Sr carbonate in an amount of 17 pts.mass with respect to magnesium primary phosphate in an amount of 100 pts.mass in terms of solid content.

(Treatment agent for forming an insulating film D) A treatment agent containing a colloidal silica in an amount of 80 pts.mass in terms of $SiO_2$ solid content, Mg nitrate in an amount of 50 pts.mass, and Ca citrate in an amount of 15 pts.mass with respect to magnesium primary phosphate in an amount of 100 pts.mass in terms of solid content.

(Treatment agent for forming an insulating film E) A treatment agent containing a colloidal silica in an amount of 80 pts.mass in terms of $SiO_2$ solid content, Mg nitrate in an amount of 50 pts.mass, and Ba nitrate in an amount of 17 pts.mass with respect to magnesium primary phosphate in an amount of 100 pts.mass in terms of solid content.

The film structure, adhesion property of an insulating film, and tension applied to the steel sheet (film tension) of each of the samples of the grain-oriented electrical steel sheets with an insulating film obtained as described above were investigated. The evaluation results are given in Table 1. In addition, Table 2 illustrates, for example, regarding the case of samples of Nos. 1-2 to 1-5 and 1-18 in Table 1, the processes utilizing glow discharge optical emission spectroscopy to obtain the investigation results of the film structure given in Table 1.

The tension applied to a steel sheet (film tension) was defined as tension in the rolling direction and calculated by using formula (I) below, after a test specimen having a length in the rolling direction of 280 mm and a length in a direction perpendicular to the rolling direction of 30 mm had been taken from each of the samples of the grain-oriented electrical steel sheets with an insulating tension film, the film on one side of the taken test specimen had been removed in an alkali, an acid, or the like, and the warpage of a portion having a warpage measurement length of 250 mm had been determined with one end of the above-described test specimen having a length of 30 mm being fixed.

Tension applied to steel sheet [MPa]=Young's modulus of steel sheet [GPa]×steel sheet thickness [mm]×warpage [mm]÷(warpage measurement length [mm])$^2$×10$^3$ equation (I)

Here, Young's modulus of the steel sheet was assigned a value of 132 GPa.

A case of a film tension of 8.0 MPa or more was judged as good (excellent in terms of film tension).

Adhesion property was evaluated by using a crosscut method prescribed in JIS K 5600-5-6. Cellotape (registered trademark) CT-18 (having an adhesive force of 4.01 N/(10 mm)) is used as an adhesive tape in such evaluation, and the numbers of grid squares of 2 mm square in which peeling occurred (number of peeling) are given in Table 1 below. A case of a number of peeling of 3 or less was judged as a case of an excellent adhesion property.

A film structure was investigated by determining the element distribution in the film thickness direction perpendicular to the film surface by using glow discharge optical emission spectroscopy (hereinafter, referred to as "GDS"). By performing determination and comparison in the thickness direction from the surface of the insulating film regarding characteristic constituents contained in the insulating film, the base film, and the steel substrate and Sr, Ca, and Ba, it was clarified where Sr, Ca, and Ba were segregated in the insulating film and the base film. Here, the film structure was determined by utilizing the fact that Mg was contained in the insulating film and the base film and that a Mg content level varied between the insulating film and the base film. That is, when the thickness of the insulating film is defined as N and the thickness of the base film was defined as M, and when the position of the surface of the insulating film was defined as x(0), from the spectral shapes of Mg, Sr, Ca, and Ba, in the thickness direction from the surface of the insulating film, the position of the interface between the insulating film and the base film x(N), the central position of the thickness of the insulating film x(N/2), and the central position of the thickness of the base film x(N+M/2) were determined, and the positional relationship among positions x(Sr(C)), x(Ca(C)), and x(Ba(C)), at which the maximum values of the Sr concentration, the Ca concentration, and the Ba concentration were taken, respectively, in a thickness region formed by combining the insulating film and the base film, was investigated.

The position of the interface between the insulating film and the base film x(N), the central position of the thickness of the insulating film x(N/2), and the central position of the thickness of the base film x(N+M/2) were determined as described below by utilizing the fact that Mg was contained in the insulating film and the base film and that a Mg content level varied between the insulating film and the base film. Here, Fe spectrum was also determined, because this facilitated the determination of the positions of the base film and the steel substrate.

x(N): position at which the Mg spectral shape was convex downward with a slope of 0 x(N/2): central position between x(0) and x(N)

x(N+M/2): of positions at which the Mg spectral shape was convex upward with a slope of 0, one nearest to the steel substrate x(Sr(C)): of positions at which the Sr spectral shape was convex upward with a slope of 0, one at which the maximum value of the Sr concentration (Sr spectral intensity) was taken in a region formed by combining the insulating film and the base film x(Ca(C)): of positions at which the Ca spectral shape was convex upward with a slope of 0, one at which the maximum value of the Ca concentration (Ca spectral intensity) was taken in a region formed by combining the insulating film and the base film x(Ba(C)): of positions at which the Ba spectral shape was convex upward with a slope of 0, one at which the maximum value of the Ba concentration (Ba spectral intensity) was taken in a region formed by combining the insulating film and the base film In the case where Mg is not contained in the insulating film, the position of the interface between the insulating film and the base film x(N), the central position of the thickness of the insulating film x(N/2), and the central position of the thickness of the base film x(N+M/2) were determined as described below.

x(N): thickness of the insulating film was determined by observing the cross section of the insulating film with an electron microscope (SEM, TEM, STEM, or the like), and the position of the interface between the insulating film and the base film was calculated from the sputtering speed of GDS x(N/2): central position between x(0) and x(N)

x(N+M/2): of positions at which the Mg spectral shape was convex upward with a slope of 0, one nearest to the steel substrate x(Sr(C)): of positions at which the Sr spectral shape was convex upward with a slope of 0, one at which the maximum value of the Sr concentration (Sr spectral intensity) was taken in a region formed by combining the insulating film and the base film x(Ca(C)): of positions at which the Ca spectral shape was convex upward with a slope of 0, one at which the maximum value of the Ca concentration (Ca spectral intensity) was taken in a region formed by combining the insulating film and the base film x(Ba(C)): of positions at which the Ba spectral shape was convex upward with a slope of 0, one at which the maximum value of the Ba concentration (Ba spectral intensity) was taken in a region formed by combining the insulating film and the base film Here, a method used for determining the Mg concentration, the Sr concentration, the Ca concentration, and the Ba concentration and the position at which each of the peak values of the Mg concentration, the Sr concentration, the Ca concentration, and the Ba concentration is taken is not limited to GDS, and physical analysis such as SIMS (secondary ion mass spectroscopy) or other kind of chemical analysis may be used as long as it is a method with which it is possible to evaluate such concentrations and peak values.

In addition, the maximum Sr concentration Sr(A), the maximum Ca concentration Ca(A), and the maximum Ba concentration Ba(A) in a region from position x(0) to position x(N/2) described above, the Sr concentration Sr(B), the Ca concentration Ca(B), and the Ba concentration Ba(B) at position x(N) described above, and the maximum Sr concentration Sr(C), the maximum Ca concentration Ca(C), and the maximum Ba concentration Ba(C) in a thickness region formed by combining the insulating film and the base film were compared in terms of spectral intensity.

Here, the time (second) in Table 2 corresponds to a distance in the depth direction (thickness direction) from the position x(0).

TABLE 1

| No. | Grain-oriented Electrical Steel Sheet with Base Film | Treatment Agent for Forming Insulating Film*[1] | V*[2] [° C./s] | DP*[3] [° C.] | Baking Temperature T [° C.] | Film Structure*[4] x(N/2) < x(Sr(C)) ≤ x(N + M/2) | Sr(C) > Sr(B) | Sr(B) ≥ Sr(A) ≥ 0 | x(N/2) < x(Ca(C)) ≤ x(N + M/2) |
|---|---|---|---|---|---|---|---|---|---|
| 1-1 | A | A | 25 | −25 | 780 | x | ○ | ○ | x |
| 1-2 | A | A | 25 | −25 | 800 | ○ | ○ | ○ | x |
| 1-3 | A | A | 18 | −25 | 850 | x | ○ | x | x |
| 1-4 | A | A | 20 | −25 | 850 | ○ | ○ | ○ | x |
| 1-5 | A | A | 25 | −14 | 850 | x | ○ | ○ | x |
| 1-6 | A | A | 25 | −15 | 850 | ○ | ○ | ○ | x |
| 1-7 | A | C | 25 | −25 | 850 | x | ○ | x | x |
| 1-8 | A | D | 25 | −25 | 850 | ○ | ○ | ○ | x |
| 1-9 | A | E | 25 | −25 | 850 | ○ | ○ | ○ | x |
| 1-10 | B | A | 25 | −30 | 850 | x | x | ○ | ○ |
| 1-11 | B | A | 25 | −31 | 850 | x | x | ○ | x |
| 1-12 | B | B | 40 | −25 | 850 | x | x | ○ | ○ |
| 1-13 | B | B | 43 | −25 | 850 | x | x | ○ | x |
| 1-14 | A | A | 25 | −25 | 1000 | ○ | ○ | ○ | x |
| 1-15 | B | C | 25 | −25 | 850 | x | ○ | x | ○ |
| 1-16 | B | D | 25 | −25 | 850 | x | x | ○ | x |
| 1-17 | B | E | 25 | −25 | 850 | x | x | ○ | ○ |
| 1-18 | C | A | 25 | −25 | 850 | x | x | ○ | x |
| 1-19 | C | C | 25 | −25 | 850 | x | ○ | x | x |
| 1-20 | C | D | 25 | −25 | 850 | x | x | ○ | x |
| 1-21 | C | E | 25 | −25 | 850 | x | x | ○ | x |

| No. | Film Structure*[4] Ca(C) > Ca(B) | Ca(B) ≥ Ca(A) ≥ 0 | x(N/2) < x(Ba(C)) ≤ x(N + M/2) | Ba(C) > Ba(B) | Ba(B) ≥ Ba(A) ≥ 0 | Adhesion Property Number of Peeling [—] | Film Tension [MPa] | Note |
|---|---|---|---|---|---|---|---|---|
| 1-1 | x | ○ | x | x | ○ | 0 | 7.4 | Comparative Example |
| 1-2 | x | ○ | x | x | ○ | 1 | 8.0 | Example |
| 1-3 | x | ○ | x | x | ○ | 4 | 8.5 | Comparative Example |
| 1-4 | x | ○ | x | x | ○ | 2 | 8.1 | Example |
| 1-5 | x | ○ | x | x | ○ | 4 | 7.5 | Comparative Example |
| 1-6 | x | ○ | x | x | ○ | 3 | 8.2 | Example |
| 1-7 | x | ○ | x | x | ○ | 4 | 8.7 | Comparative Example |
| 1-8 | ○ | x | x | x | ○ | 4 | 8.8 | Comparative Example |
| 1-9 | x | ○ | x | ○ | x | 5 | 8.6 | Comparative Example |
| 1-10 | ○ | ○ | x | x | ○ | 3 | 8.4 | Example |
| 1-11 | ○ | ○ | x | x | ○ | 5 | 8.5 | Comparative Example |
| 1-12 | ○ | ○ | x | x | ○ | 2 | 8.2 | Example |
| 1-13 | ○ | ○ | x | x | ○ | 4 | 7.5 | Comparative Example |
| 1-14 | x | ○ | x | x | ○ | 3 | 8.5 | Example |
| 1-15 | ○ | ○ | x | x | ○ | 4 | 8.6 | Comparative Example |
| 1-16 | ○ | x | x | x | ○ | 5 | 8.8 | Comparative Example |
| 1-17 | ○ | ○ | x | ○ | x | 4 | 8.6 | Comparative Example |
| 1-18 | x | ○ | ○ | ○ | ○ | 1 | 8.0 | Example |
| 1-19 | x | ○ | ○ | ○ | ○ | 4 | 8.6 | Comparative Example |

TABLE 1-continued

| | | | | | | | | |
|---|---|---|---|---|---|---|---|---|
| 1-20 | ○ | x | ○ | ○ | ○ | 5 | 8.8 | Comparative Example |
| 1-21 | x | ○ | x | ○ | x | 4 | 8.6 | Comparative Example |

*1Treatment agents A and B contain substantially no Sr, Ca, or Ba.
Treatment agent C contains Sr carbonate in an amount of 17 pts · mass with respect to magnesium phosphate in an amount of 100 pts · mass.
Treatment agent D contains Ca citrate in an amount of 15 pts · mass with respect to magnesium phosphate in an amount of 100 pts · mass.
Treatment agent E contains Ba nitrate in an amount of 17 pts · mass with respect to magnesium phosphate in an amount of 100 pts · mass.
*2average heating rate in a temperature range of 50° C. to 200° C.
*3dew-point temperature in a temperature range of 50° C. to 200° C.
*4A case conforming to the inequality is denoted by "○", and a case non-conforming to the inequality is denoted by "x".

TABLE 2

| No. | Film Structure*13 | | | | | | | | | Note |
|---|---|---|---|---|---|---|---|---|---|---|
| 1-2 | x(N/2) [sec] | x(N + M/2) [sec] | x(Sr(C)) [sec] | Sr(A)*1 [V] | Sr(B)*2 [V] | Sr(C)*3 [V] | x(N/2) < x(Sr(C)) ≤ x(N + M/2) | Sr(C) > Sr(B) | Sr(B) ≥ Sr(A) ≥ 0 | Example |
| | 9 | 32 | 29 | 0.71 | 1.29 | 5.81 | ○ | ○ | ○ | |
| | | | x(Ca(C))*4 [sec] | Ca(A)*5 [V] | Ca(B)*6 [V] | Ca(C)*7 [V] | x(N/2) < x(Ca(C)) ≤ x(N + M/2) | Ca(C) > Ca(B) | Ca(B) ≥ Ca(A) ≥ 0 | |
| | | | — | 0 | 0 | 0 | x | x | ○ | |
| | | | x(Ba(C))*8 [sec] | Ba(A)*9 [V] | Ba(B)*10 [V] | Ba(C)*11 [V] | x(N/2) < x(Ba(C)) ≤ x(N + M/2) | Ba(C) > Ba(B) | Ba(B) ≥ Ba(A) ≥ 0 | |
| | | | — | 0 | 0 | 0 | x | x | ○ | |
| 1-3 | x(N/2) [sec] | x(N + M/2) [sec] | x(Sr(C)) [sec] | Sr(A)*1 [V] | Sr(B)*2 [V] | Sr(C)*3 [V] | x(N/2) < x(Sr(C)) ≤ x(N + M/2) | Sr(C) > Sr(B) | Sr(B) ≥ Sr(A) ≥ 0 | Comparative Example |
| | 9 | 33 | 8 | 4.20 | 0.23 | 5.20 | x | ○ | x | |
| | | | x(Ca(C))*4 [sec] | Ca(A)*5 [V] | Ca(B)*6 [V] | Ca(C)*7 [V] | x(N/2) < x(Ca(C)) ≤ x(N + M/2) | Ca(C) > Ca(B) | Ca(B) ≥ Ca(A) ≥ 0 | |
| | | | — | 0 | 0 | 0 | x | x | ○ | |
| | | | x(Ba(C))*8 [sec] | Ba(A)*9 [V] | Ba(B)*10 [V] | Ba(C)*11 [V] | x(N/2) < x(Ba(C)) ≤ x(N + M/2) | Ba(C) > Ba(B) | Ba(B) ≥ Ba(A) ≥ 0 | |
| | | | — | 0 | 0 | 0 | x | x | ○ | |
| 1-4 | x(N/2) [sec] | x(N + M/2) [sec] | x(Sr(C)) [sec] | Sr(A)*1 [V] | Sr(B)*2 [V] | Sr(C)*3 [V] | x(N/2) < x(Sr(C)) ≤ x(N + M/2) | Sr(C) > Sr(B) | Sr(B) ≥ Sr(A) ≥ 0 | Example |
| | 8 | 34 | 27 | 0.57 | 1.35 | 5.89 | ○ | ○ | ○ | |
| | | | x(Ca(C))*4 [sec] | Ca(A)*5 [V] | Ca(B)*6 [V] | Ca(C)*7 [V] | x(N/2) < x(Ca(C)) ≤ x(N + M/2) | Ca(C) > Ca(B) | Ca(B) ≥ Ca(A) ≥ 0 | |
| | | | — | 0 | 0 | 0 | x | x | ○ | |
| | | | x(Ba(C))*8 [sec] | Ba(A)*9 [V] | Ba(B)*10 [V] | Ba(C)*11 [V] | x(N/2) < x(Ba(C)) ≤ x(N + M/2) | Ba(C) > Ba(B) | Ba(B) ≥ Ba(A) ≥ 0 | |
| | | | — | 0 | 0 | 0 | x | x | ○ | |
| 1-5 | x(N/2) [sec] | x(N + M/2) [sec] | x(Sr(C)) [sec] | Sr(A)*1 [V] | Sr(B)*2 [V] | Sr(C)*3 [V] | x(N/2) < x(Sr(C)) ≤ x(N + M/2) | Sr(C) > Sr(B) | Sr(B) ≥ Sr(A) ≥ 0 | Comparative Example |
| | 10 | 33 | 37 | 0.15 | 0.55 | 6.11 | x | ○ | ○ | |
| | | | x(Ca(C))*4 [sec] | Ca(A)*5 [V] | Ca(B)*6 [V] | Ca(C)*7 [V] | x(N/2) < x(Ca(C)) ≤ x(N + M/2) | Ca(C) > Ca(B) | Ca(B) ≥ Ca(A) ≥ 0 | |
| | | | — | 0 | 0 | 0 | x | x | ○ | |
| | | | x(Ba(C))*8 [sec] | Ba(A)*9 [V] | Ba(B)*10 [V] | Ba(C)*11 [V] | x(N/2) < x(Ba(C)) ≤ x(N + M/2) | Ba(C) > Ba(B) | Ba(B) ≥ Ba(A) ≥ 0 | |
| | | | — | 0 | 0 | 0 | x | x | ○ | |
| 1-18 | x(N/2) [sec] | x(N + M/2) [sec] | x(Sr(C))*12 [sec] | Sr(A)*1 [V] | Sr(B)*2 [V] | Sr(C)*3 [V] | x(N/2) < x(Sr(C)) ≤ x(N + M/2) | Sr(C) > Sr(B) | Sr(B) ≥ Sr(A) ≥ 0 | Example |
| | 9 | 33 | — | 0 | 0 | 0 | x | x | ○ | |
| | | | x(Ca(C))*4 [sec] | Ca(A)*5 [V] | Ca(B)*6 [V] | Ca(C)*7 [V] | x(N/2) < x(Ca(C)) ≤ x(N + M/2) | Ca(C) > Ca(B) | Ca(B) ≥ Ca(A) ≥ 0 | |
| | | | — | 0 | 0 | 0 | x | x | ○ | |
| | | | x(Ba(C)) [sec] | Ba(A)*9 [V] | Ba(B)*10 [V] | Ba(C)*11 [V] | x(N/2) < x(Ba(C)) ≤ x(N + M/2) | Ba(C) > Ba(B) | Ba(B) ≥ Ba(A) ≥ 0 | |
| | | | 27 | 0.09 | 0.33 | 1.42 | ○ | ○ | ○ | |

*1maximum Sr concentration (spectral intensity) in a region from position x(0) to position x(N/2)
*2Sr concentration (spectral intensity) at position x(N)
*3maximum Sr concentration (spectral intensity) in a thickness region formed by combining the insulating film and the base film
*4containing no Ca
*5maximum Ca concentration (spectral intensity) in a region from position x(0) to position x(N/2)
*6Ca concentration (spectral intensity) at position x(N)
*7maximum Ca concentration (spectral intensity) in a thickness region formed by combining the insulating film and the base film
*8containing no Ba
*9maximum Ba concentration (spectral intensity) in a region from position x(0) to position x(N/2)
*10Ba concentration (spectral intensity) at position x(N)
*11maximum Ba concentration (spectral intensity) in a thickness region formed by combining the insulating film and the base film
*12containing no Sr
*13A case conforming to the inequality in the table is denoted by "○", and a case non-conforming to the inequality is denoted by "x".

From the results described above, it was found that an excellent adhesion property and excellent film tension are achieved in the case where at least one of condition 1, condition 2, and condition 3 below is satisfied and the relational expressions Sr(B)≥Sr(A)≥0, Ca(B)≥Ca(A)≥0, and Ba(B)≥Ba(A)≥0 are satisfied, where the thickness of the insulating film is defined as N and the thickness of the base film is defined as M, where, in the thickness direction from the surface of the insulating film, the position of the surface of the insulating film is defined as x(0), the central position of the thickness of the insulating film is defined as x(N/2), the position of the interface between the insulating film and the base film is defined as x(N), and the central position of the thickness of the base film is defined as x(N+M/2), where the maximum values of the Sr concentration, the Ca concentration, and the Ba concentration in a region from position x(0) to position x(N/2) are defined as Sr(A), Ca(A), and Ba(A), respectively, and the Sr concentration, the Ca concentration, and the Ba concentration at position x(N) are defined as Sr(B), Ca(B), and Ba(B), respectively, and where the maximum values of the Sr concentration, the Ca concentration, and the Ba concentration in a thickness region formed by combining the insulating film and the base film are defined as Sr(C), Ca(C), and Ba(C), respectively, and positions at which the values Sr(C), Ca(C), and Ba(C) are taken are defined as x(Sr(C)), x(Ca(C)), and x(Ba(C)), respectively.

$x(N/2)<x(Sr(C))\leq x(N+M/2)$ and $Sr(C)>Sr(B)$ [Condition 1]

$x(N/2)<x(Ca(C))\leq x(N+M/2)$ and $Ca(C)>Ca(B)$ [Condition 2]

$x(N/2)<x(Ba(C))\leq x(N+M/2)$ and $Ba(C)>Ba(B)$ [Condition 3]

In addition, it was found that it is possible to obtain a grain-oriented electrical steel sheet with an insulating film having excellent adhesion property of an insulating film and a high film tension of 8.0 MPa or more by applying a treatment agent for forming an insulating film which contains mainly a metal phosphate and a colloidal silica and which contains substantially no Sr, Ca, or Ba to the surface of a grain-oriented electrical steel sheet which has been subjected to finish annealing, which has a base film composed mainly of forsterite on the surface thereof, and which contains at least one of Sr, Ca, and Ba in the base film, by thereafter heating the steel sheet at an average heating rate (V (° C./s)) of 20° C./s or higher and 40° C./s or lower in an atmosphere having a dew-point temperature (DP (° C.)) of −30° C. or higher and −15° C. or lower in a temperature range of 50° C. to 200° C., and by thereafter baking the steel sheet at a baking temperature (T (° C.)) of 800° C. or higher and 1000° C. or lower to form an insulating film on the surface of the base film. By forming an insulating film as described above, it was possible to obtain a grain-oriented electrical steel sheet with an insulating film having an excellent adhesion property of an insulating film and a high film tension of 8.0 MPa or more.

The reason why it is possible to achieve an insulating film which is excellent in terms of both adhesion property and film tension according to aspects of the present invention is presumed to be because of the following reason. Sr, Ca, and Ba contained in the base film are diffused into an insulating film in a process in which the insulating film is baked, in the case where a treatment agent for forming the insulating film, which is applied to the surface of the base film and thereafter baked, does not contain Sr, Ca, or Ba, or in the case where the concentrations of Sr, Ca, and Ba in such a treatment agent are lower than those in the base film. As a result, the concentration gradients of Sr, Ca, and Ba are generated from the interface between the base film and the insulating film toward the surface of the insulating film. Since such concentration gradients cause a gradual decrease (gradient) in thermal expansion coefficient from the surface of the insulating film toward the interface between the base film and the insulating film, it is considered that peeling of the insulating film, which is caused by a difference in thermal expansion coefficient generated in the vicinity of the interface between the base film and the insulating film, is inhibited.

The reason why it is necessary to perform heating at an average heating rate (V (° C./s)) of 20° C./s or higher and 40° C./s or lower in an atmosphere having a dew-point temperature (DP (° C.)) of −30° C. or higher and −15° C. or lower in a temperature range of 50° C. to 200° C. and to thereafter perform baking at a baking temperature (T (° C.)) of 800° C. or higher and 1000° C. or lower to form an insulating film is considered to be because it is possible to achieve sufficient film tension by performing heating at the average heating rate V described above in the temperature range of 50° C. to 200° C. and by performing baking at the baking temperature T described above and because it is possible to appropriately control the amount of Sr, Ca, and Ba diffused so that the thermal expansion coefficient with which it is possible to achieve a sufficient adhesion property is achieved by performing heating at the average heating rate V described above in the atmosphere having the dew-point temperature DP (° C.) described above in the temperature range of 50° C. to 200° C.

Hereafter, the constituent features related to aspects of the present invention will be described in detail.

<Steel Grade>

First, the preferable chemical composition of the steel sheet will be described. Hereinafter, "%", which is the unit of the content of each of the elements, denotes "mass %", unless otherwise noted.

C: 0.001% to 0.10%

C is a constituent which is effective for forming crystal grains with a Goss orientation, and it is preferable that the C content be 0.001% or more to effectively realize such a function. On the other hand, in the case where the C content is more than 0.10%, poor decarburization may occur, even in the case where decarburization annealing is performed. Therefore, it is preferable that the C content be 0.001% to 0.10%.

Si: 1.0% to 5.0%

Si is a constituent which is necessary to decrease iron loss by increasing electrical resistance and to enable high-temperature heat treatment by stabilizing the BCC microstructure of iron, and it is preferable that the Si content be 1.0% or more. On the other hand, in the case where the Si content is more than 5.0%, it may be difficult to perform ordinary cold rolling. Therefore, it is preferable that the Si content be 1.0% to 5.0%. It is more preferable that the Si content be 2.0% to 5.0%.

Mn: 0.01% to 1.0%

Mn not only effectively contributes to remedying the hot shortness of steel but also functions as a crystal grain growth inhibitor by forming precipitates such as MnS and MnSe in the case where S and Se exist. To effectively realize such functions, it is preferable that the Mn content be 0.01% or more. On the other hand, in the case where the Mn content is more than 1.0%, there may be a case where effectiveness as an inhibitor is lost due to an increase in the grain diameter of precipitates such as MnSe. Therefore, it is preferable that the Mn content be 0.01% to 1.0%.

Sol.Al: 0.003% to 0.050%

Since sol.Al is an effective constituent which functions as an inhibitor by forming a dispersion second phase in the form of AlN in steel, it is preferable that Al be added in the form of sol.Al in an amount of 0.003% or more. On the other hand, in the case where Al is added in the form of sol.Al in an amount of more than 0.050%, there may be a case where function as an inhibitor is lost due to an increase in the grain diameter of AlN precipitated. Therefore, it is preferable that Al be added in the form of sol.Al in an amount of 0.003% to 0.050%.

N: 0.001% to 0.020%

Since N is, like Al, also a constituent which is necessary to form AlN, it is preferable that the N content be 0.001% or more. On the other hand, in the case where the N content is more than 0.020%, a blister or the like may occur when slab is heated. Therefore, it is preferable that the N content be 0.001% to 0.020%.

One or Both Selected from S and Se: 0.001% to 0.05% in total

S and Se are effective constituents which function as inhibitors in combination with Mn and Cu to form a dispersion second phase in steel in the form of MnSe, MnS, $Cu_2$-xSe, and $Cu_2$-xS. To realize the useful effect due to addition, it is preferable that the total content of S and Se be 0.001% or more. On the other hand, in the case where the total content of S and Se is more than 0.05%, there may be a case where the solid solution formation of S and Se is incomplete when slab heating is performed and also where a surface defect occurs in a product. Therefore, in both the case where one of S and Se is added and the case where both of S and Se are added, it is preferable that the total content be 0.001% to 0.05%.

It is preferable that the constituents described above be the basic constituents of steel. In addition, the remainder of the chemical composition other than the constituents described above may be Fe and incidental impurities.

In addition, the chemical composition described above may further contain one or more selected from Cu: 0.2% or less, Ni: 0.5% or less, Cr: 0.5% or less, Sb: 0.1% or less, Sn: 0.5% or less, Mo: 0.5% or less, and Bi: 0.1% or less. By adding elements which function as auxiliary inhibitors, it is possible to further improve magnetic properties. Examples of such elements include the elements described above, which are selected from the viewpoints of ease of crystal grain boundary segregation and surface segregation. To realize the useful effect of each of the elements, it is preferable that, in the case where such element is contained, the Cu content be 0.01% or more, the Ni content be 0.01% or more, the Cr content be 0.01% or more, the Sb content be 0.01% or more, the Sn content be 0.01% or more, the Mo content be 0.01% or more, and Bi content be 0.001% or more. In addition, in the case where the content of each of the elements described above is more than the respective upper limits described above, since the surface appearance of the film and secondary recrystallization tend to be poor, it is preferable that the content of each of the elements described above be within the respective ranges.

Moreover, the chemical composition may further contain one, two, or more selected from B: 0.01% or less, Ge: 0.1% or less, As: 0.1% or less, P: 0.1% or less, Te: 0.1% or less, Nb: 0.1% or less, Ti: 0.1% or less, and V: 0.1% or less in addition to the constituents described above. By adding one, two, or more of these elements, there is a further increase in the effect of inhibiting crystal grain growth, and thus it is possible to stably achieve a higher magnetic flux density. Such an effect becomes saturated in the case where the content of each of these elements is more than the respective range described above. Therefore, in the case where these elements are added, the content of each of these elements is set to be in the respective range described above. Although there is no particular limitation on the lower limits of the contents of these elements, to realize the useful effect of each of the elements, it is preferable that the B content be 0.001% or more, the Ge content be 0.001% or more, the As content be 0.005% or more, the P content be 0.005% or more, the Te content be 0.005% or more, the Nb content be 0.005% or more, the Ti content be 0.005% or more, and the V content be 0.005% or more.

<Grain-Oriented Electrical Steel Sheet Having Base Film Composed Mainly of Forsterite on Surface thereof which has been Subjected to Finish Annealing (Grain-Oriented Electrical Steel Sheet With Base Film)>

Molten steel having the chemical composition described above is prepared by using a known refining process and made into a steel material (steel slab) by using a continuous casting method or an ingot casting-blooming method. Subsequently, the steel slab is subjected to hot rolling by using a known method, and the hot rolled steel sheet is subjected to cold rolling once or twice or more with intermediate annealing interposed between periods in which cold rolling is performed to obtain a final thickness. Subsequently, after decarburization annealing (primary recrystallization annealing) has been performed, an annealing separator is applied, and finish annealing is thereafter performed to manufacture a grain-oriented electrical steel sheet having a ceramic base film on the surface thereof. Such a ceramic base film is composed of complex oxides such as forsterite ($Mg_2SiO_4$), spinel ($MgAl_2O_4$), cordierite ($Mg_2Al_4Si_5O_{16}$), and the like and contains mainly forsterite.

In accordance with aspects of the present invention, a "base film composed mainly of forsterite" may contain such complex oxides and the like which are formed incidentally.

In accordance with aspects of the present invention, the expression "composed mainly of forsterite" denotes a case where the area fraction of forsterite in a base film is 50% or more. In a method for determining the fraction of forsterite, when elemental mapping regarding Mg, Mn, Si, Al, and O is performed on an observation surface for grain diameter of a base film by using SEM-EDS (scanning electron microscope-energy-dispersive X-ray spectrometry), a region in which Mg, Si, and O are simultaneously detected (Al and Mn may also be detected) is identified as "forsterite", and a case where the area fraction of such regions is 50% or more is judged as a case corresponding to the expression "composed mainly of forsterite". Here, there is no particular limitation on the contents (area fraction), shapes, and the like of spinel, cordierite, and the like which are not identified as forsterite.

In accordance with aspects of the present invention, by using an annealing separator containing at least one of Sr, Ca, and Ba as the annealing separator described above, and by performing finish annealing after having applied such an annealing separator, it is possible to manufacture a grain-oriented electrical steel sheet having a base film containing at least one of Sr, Ca, and Ba. It is preferable that the annealing separator described above be an annealing separator containing at least one of a Sr salt, a Ca salt, and a Ba salt. Examples of the Sr salt mentioned above include Sr sulfate, Sr sulfide, Sr hydroxide, and the like. Examples of the Ca salt mentioned above include Ca sulfate, Ca oxide, and the like. In addition, examples of the Ba salt mentioned above include Ba sulfate, Ba nitrate, and the like.

Regarding the content of at least one of Sr, Ca, and Ba in a grain-oriented electrical steel sheet with a base film, it is preferable that the total amount of Sr, Ca, and Ba be 0.0001 pts.mass or more and 0.07 pts.mass or less with respect to the grain-oriented electrical steel sheet with a base film in an amount of 100 pts.mass. In the case where the total amount of at least one of Sr, Ca, and Ba is within the range described above, since the amounts of Sr, Ca, and Ba diffused into the insulating film and the concentration distributions of Sr, Ca, and Ba in the insulating film are appropriately controlled so that excellent film tension and adhesion property are achieved, it is easy to obtain a film structure having distribution gradient of thermal expansion coefficient appropriately controlled so that excellent film tension and adhesion property are achieved. Here, it is possible to control the contents of Sr, Ca, and Ba in the grain-oriented electrical steel sheet with a base film by controlling the contents of Sr, Ca, and Ba in the annealing separator described above. In addition, it is possible to determine the contents of Sr, Ca, and Ba in the grain-oriented electrical steel sheet with a base film, for example, by using ICP emission spectrometry.

<Insulating Film>

The insulating film formed on the surface of the grain-oriented electrical steel sheet with a base film described above contains mainly silicate-phosphate glass composed of a metal phosphate and a colloidal silica. Here, the expression "containing mainly silicate-phosphate glass" denotes a case where the content of silicate-phosphate glass in the insulating film is 50 mass % or more. In addition, it is preferable that the insulating film according to aspects of the present invention be chromium-free (contain substantially no Cr). Here, the expression "containing substantially no Cr" denotes a case where Cr is not contained with the exception that Cr is incidentally contained in an insulating film. Here, in accordance with aspects of the present invention, at least one of Sr, Ca, and Ba has the concentration distribution described below in the film formed by combining the insulating film and the base film described above.

<Treatment Agent for Forming Insulating Film>

The treatment agent for forming the insulating film described above contains mainly a metal phosphate and a colloidal silica. Here, the expression "containing mainly a metal phosphate and a colloidal silica" denotes a case where, in terms of solid content, the total content of a metal phosphate and a colloidal silica is 50 mass % or more with respect to all the constituents of the treatment agent for forming an insulating film. In addition, the concentrations of Sr, Ca, and Ba in the treatment agent for forming an insulating film are set to be within ranges in which Sr, Ca, and Ba in the base film are able to be diffused into the insulating film during the insulating film being baked. It is preferable that the treatment agent for forming an insulating film contain substantially no Sr, Ca, or Ba. By using a treatment agent for forming an insulating film which contains substantially no Sr, Ca, or Ba, it is easy to form a film having specified concentration distributions of Sr, Ca, and Ba after baking has been performed on the insulating film. Here, the expression "containing substantially no Sr, Ca, or Ba" denotes a case where no Sr, Ca, or Ba is intentionally added to the treatment agent described above.

The metal used for the metal phosphate contained in the insulating film described above is not limited to Mg and Al as long as it has a non-crystalline structure, and examples of such a metal include Zn, Mn, Fe, Ni, and the like with the exception of Sr, Ca, and Ba. In addition, a mixture of one, two, or more kinds of metal phosphates may be used. Moreover, the treatment agent for forming an insulating film described above may contain not only a metal phosphate and a colloidal silica described below but also a material which maintains the insulating film to be non-crystalline such as chromium acid, $TiO_2$, and the like.

In the treatment agent for forming an insulating film, it is preferable that a colloidal silica be contained in an amount of 50 pts.mass or more and 200 pts.mass or less in terms of $SiO_2$ solid content with respect to a metal phosphate in an amount of 100 pts.mass in terms of solid mass content. It is particularly preferable that a colloidal silica be contained in an amount of 120 pts.mass or more in terms of $SiO_2$ solid content with respect to a metal phosphate in an amount of 100 pts.mass. By adding a colloidal silica to the treatment agent for forming an insulating film, the insulating film formed by using such a treatment agent for forming an insulating film increases the effect of applying tension to a steel sheet and the effect of decreasing the iron loss of a steel sheet. However, in the case where there is a relative decrease in the content of a metal phosphate with respect to the content of a colloidal silica, there may be a case where film adhesion property deteriorates. In accordance with aspects of the present invention, since there is an improvement in film adhesion property due to the concentration gradients of Sr, Ca, and Ba in the film, it is possible to add a colloidal silica in an amount of 120 pts.mass or more in terms of $SiO_2$ solid content with respect to a metal phosphate in an amount of 100 pts.mass, which results in an improvement in film adhesion property while a higher level of film tension is achieved.

Such a treatment agent for forming an insulating film may contain a water-soluble metallic salt and a metal oxide as other additive substances. Examples of a water-soluble metallic salt which may be added include Mg nitrate, Mn sulfate, Zn oxalate, and the like. Examples of metal oxide which may be added include $SnO_2$ sol, $Fe_2O_3$ sol, and the like. However, such examples exclude compounds containing Sr, Ca, or Ba.

The treatment agent for forming an insulating film according to aspects of the present invention may be prepared under known conditions by using a known method. For example, the treatment agent for forming an insulating film according to aspects of the present invention may be prepared by mixing the constituents described above in a solvent such as water or the like. Here, in such a solvent, Sr, Ca, or Ba may be contained as long as the concentrations of Sr, Ca, and Ba are within ranges in which Sr, Ca, and Ba in the base film are able to be diffused into the insulating film during the insulating film being baked. For example, in the case where water is used as a solvent, there may be a case where Ca is contained in such water, and such a case is acceptable as long as the Ca concentration is within the range described above. However, in the case where water is used as a solvent, from the viewpoint of facilitating the formation of a film having the specified concentration distributions, it is preferable that ion-exchanged water be used.

<Method for Forming Insulating Film>

Although there is no particular limitation on the method used for forming the insulating film according to aspects of the present invention, the insulating film may be formed by applying the treatment agent for forming an insulating film on the surface of the grain-oriented electrical steel sheet with the base film and by thereafter performing the specified baking.

(Applying)

There is no particular limitation on the method for applying the treatment agent for forming the insulating film to the surface of the grain-oriented electrical steel sheet with the base film, and a known method may be used. It is preferable that the treatment agent for forming the insulating film be applied to both sides of the grain-oriented electrical steel sheet with the base film, and it is more preferable that such application be performed so that the total coating weight on both sides be 4 $g/m^2$ to 15 $g/m^2$ after baking has been performed (after drying and baking have been performed in the case where drying is performed, since drying may be optionally performed after application has been performed). This is because there may be a case of a decrease in interlayer resistance when such a coating weight is excessively low and because there may be a case of a decrease in lamination factor when such a coating weight is excessively high.

(Baking)

Subsequently, baking is performed to the grain-oriented electrical steel sheet, which has been subjected to the application of the treatment agent for forming the insulating film and has been optionally subjected to drying, to form the insulating film.

At this time, from the viewpoint of performing baking which applies tension to the film and which doubles as flattening annealing, it is preferable that baking be performed at a baking temperature of 800° C. or higher and 1000° C. or lower. In addition, it is preferable that baking at such a baking temperature be performed for a baking time of 10 seconds to 300 seconds. In the case where the baking temperature is excessively low, there may be a case of a decrease in product yield due to a shape defect caused by insufficient flattening and a case where it is not possible to achieve sufficient film tension. On the other hand, in the case where the baking temperature is excessively high, since creep deformation occurs due to the excessively large effect of flattening annealing, there may be a case of a deterioration in magnetic properties. In the case of the baking temperature described above, there is sufficient and appropriate effect of flattening annealing. It is particularly preferable that the baking temperature be 850° C. or higher. In addition, it is more preferable that the baking time be 60 seconds or less. This is because, in such a case, since the amounts of Sr, Ca, and Ba diffused into the insulating film are appropriately controlled so that excellent film tension and an excellent film adhesion property are achieved, it is easy to obtain a film structure having a gradient of thermal expansion coefficient appropriately controlled so that excellent film tension and an excellent film adhesion property are achieved.

In addition, in the process of heating to a baking temperature of 800° C. to 1000° C., it is preferable that the average heating rate V (° C./s) in a temperature range of 50° C. to 200° C. be 20° C./s or more and 40° C./s or less (20 V (° C./s) 40). It is preferable that the average heating rate V (° C./s) in a temperature range of 50° C. to 200° C. be within the range described above, because, in such a case, since the amounts of Sr, Ca, and Ba diffused into the insulating film and the concentration distributions of Sr, Ca, and Ba in the insulating film are appropriately controlled so that excellent film tension and an excellent film adhesion property are achieved, it is possible to obtain a film structure having a gradient of thermal expansion coefficient appropriately controlled so that excellent film tension and an excellent film adhesion property are achieved.

In addition, it is preferable that the dew-point temperature DP (° C.) of the atmosphere (furnace atmosphere) in a temperature range of 50° C. to 200° C. be −30° C. or higher and −15° C. or lower (−30≤DP (° C.)≤−15). It is preferable that the dew-point temperature in a temperature range of 50° C. to 200° C. be within the range described above, because, in such a case, since the drying rate of the insulating film is controlled in such a manner that the amounts of Sr, Ca, and Ba diffused into the insulating film and the concentration distributions of Sr, Ca, and Ba in the insulating film are appropriately controlled so that excellent film tension and an excellent film adhesion property are achieved, it is possible to obtain a film structure having a gradient of thermal expansion coefficient appropriately controlled so that excellent film tension and an excellent film adhesion property are achieved. Here, there is no particular limitation on the conditions applied for a temperature range from a temperature higher than 200° C. to the baking temperature.

<Concentration Distributions of Sr, Ca, and Ba in Film (Film Formed by Combination of Insulating Film and Base Film)>

Regarding the concentration distributions of Sr, Ca, and Ba in the film (film formed by combining the insulating film and the base film) according to aspects of the present invention, in the case where at least one of condition 1, condition 2, and condition 3 below is satisfied and the relational expressions Sr(B)≥Sr(A)≥0, Ca(B)≥Ca(A)≥0, and Ba(B)≥Ba(A)≥0 are satisfied, where the thickness of the insulating film is defined as N and the thickness of the base film is defined as M, where, in the thickness direction from the surface of the insulating film, the position of the surface of the insulating film (outermost surface) is defined as x(0), the central position of the thickness of the insulating film is defined as x(N/2), the position of the interface between the insulating film and the base film is defined as x(N), and the central position of the thickness of the base film is defined as x(N+M/2), where the maximum values of the Sr concentration, the Ca concentration, and the Ba concentration in a region from position x(0) to position x(N/2) are defined as Sr(A), Ca(A), and Ba(A), respectively, and the Sr concentration, the Ca concentration, and the Ba concentration at position x(N) are defined as Sr(B), Ca(B), and Ba(B), respectively, and where the maximum values of the Sr concentration, the Ca concentration, and the Ba concentration in a thickness region formed by combining the insulating film and the base film are defined as Sr(C), Ca(C), and Ba(C), respectively, and positions at which the values Sr(C), Ca(C), and Ba(C) are taken are defined as x(Sr(C)), x(Ca(C)), and x(Ba(C)), respectively, it is possible to achieve an excellent film adhesion property while high film tension is achieved. Here, it is preferable that, of condition 1, condition 2, and condition 3, condition 1 be satisfied. In addition, it is more preferable that condition 1 and at least one of condition 2 and condition 3 be satisfied.

$$x(N/2)<x(Sr(C))\leq x(N+M/2) \text{ and } Sr(C)>Sr(B) \quad \text{[Condition 1]}$$

$$x(N/2)<x(Ca(C))\leq x(N+M/2) \text{ and } Ca(C)>Ca(B) \quad \text{[Condition 2]}$$

$$x(N/2)<x(Ba(C))\leq x(N+M/2) \text{ and } Ba(C)>Ba(B) \quad \text{[Condition 3]}$$

The concentration distributions of Sr, Ca, and Ba in the insulating film and the base film according to aspects of the present invention are defined as element distributions in the film thickness direction perpendicular to the surface of the film and determined by using GDS. By performing determination and comparison in the thickness direction from the surface of the insulating film regarding characteristic constituents (for example, Mg) contained in the insulating film, the base film, and the steel substrate and Sr, Ca, and Ba, it is clarified where Sr, Ca, and Ba are segregated in the insulating film and the base film. From the spectral shapes of the characteristic constituents, Sr, Ca, and Ba, when the position of the surface of the insulating film is defined as x(0), in the thickness direction from the surface of the insulating film, the position of the interface between the insulating film and the base film (x(N)), the central position of the thickness of the insulating film (x(N/2)), and the central position of the thickness of the base film (x(N+M/2)), and positions x(Sr(C)), x(Ca(C)), and x(Ba(C)), at which the maximum values of the Sr concentration, the Ca concentration, and the Ba concentration are taken, respectively, (that is, at which the slopes of the respective concentration distribution curves in the film thickness direction are 0) in a thickness region formed by combining the insulating film and the base film, are determined. The maximum Sr concentration (Sr(A)), the maximum Ca concentration (Ca(A)), and the maximum Ba concentration (Ba(A)) in a region from position x(0) to position x(N/2) described above, the Sr concentration (Sr(B)), the Ca concentration (Ca(B)), and the Ba concentration (Ba(B)) at position x(N) described above, and the maximum Sr concentration (Sr(C)), the maximum Ca concentration (Ca(C)), and the maximum Ba concentration (Ba(C)) in a thickness region formed by combining the insulating film and the base film are compared in terms of spectral intensity.

Here, the position x(N) of the interface between the insulating film and the base film, the central position x(N/2) of the thickness of the insulating film, and the central position x(N+M/2) of the thickness of the base film, and positions x(Sr(C)), x(Ca(C)), and x(Ba(C)) are determined as described below.

Since Mg is contained in the insulating film and the base film in the present embodiment and a Mg content level varies between the insulating film and the base film, the positions are defined as follows.

x(0): surface of the insulating film (position at which GDS spectrum is 0 seconds)

x(N): position at which the Mg spectral shape is convex downward with a slope of 0 x(N/2): central position (N/2) between x(0) and x(N)

x(N+M/2): of positions at which the Mg spectral shape is convex upward with a slope of 0, one nearest to the steel substrate x(Sr(C)): of positions at which the Sr spectral shape is convex upward with a slope of 0, one at which the maximum value of the Sr concentration (Sr spectral intensity) is taken in a region formed by combining the insulating film and the base film x(Ca(C)): of positions at which the Ca spectral shape is convex upward with a slope of 0, one at which the maximum value of the Ca concentration (Ca spectral intensity) is taken in a region formed by combining the insulating film and the base film x(Ba(C)): of positions at which the Ba spectral shape is convex upward with a slope of 0, one at which the maximum value of the Ba concentration (Ba spectral intensity) is taken in a region formed by combining the insulating film and the base film In Tables, description of x(N) is omitted, and x(N/2) and x(N+M/2) are given.

EXAMPLES

Hereafter, aspects of the present invention will be specifically described in accordance with examples. However, the present invention is not limited to such examples.

Example 1

A slab for a silicon steel sheet having a chemical composition containing, by mass %, Si: 3.3%, C: 0.06%, Mn: 0.05%, S: 0.01%, sol.Al: 0.02%, and N: 0.01% was heated at a temperature of 1150° C. for 20 minutes and thereafter subjected to hot rolling to obtain a hot rolled steel sheet having a thickness of 2.2 mm. The hot rolled steel sheet was subjected to annealing at a temperature of 1000° C. for one minute and thereafter subjected to cold rolling to obtain a cold rolled steel sheet having a final thickness of 0.23 mm. Subsequently, the cold rolled steel sheet was heated from room temperature to a temperature of 820° C. at a heating rate of 50° C./s and thereafter subjected to decarburization annealing at a temperature of 820° C. for 80 seconds in a wet atmosphere (containing $H_2$ in an amount of 50 vol % and $N_2$ in an amount of 50 vol % and having a dew-point temperature of 60° C.)

An annealing separator containing $TiO_2$ in an amount of 5 pts.mass, $SrSO_4$ in an amount of 5 pts.mass, and $CaSO_4$ in an amount of 0.5 pts.mass with respect to MgO in an amount of 100 pts.mass which had been made into an aqueous slurry was applied to the obtained cold rolled steel sheet, which had been subjected to decarburization annealing, and thereafter dried. The steel sheet was subjected to finish annealing, in which after the dried steel sheet had been heated from a temperature of 300° C. to a temperature of 800° C. over 100 hours, the steel sheet was heated to a temperature of 1200° C. at a heating rate of 50° C./hr and thereafter subjected to annealing at a temperature of 1200° C. for 5 hours, an unreacted annealing separator was thereafter removed, and stress-relief annealing (at a temperature of 800° C. for 2 hours) was thereafter performed to prepare a grain-oriented electrical steel sheet having a base film composed mainly of forsterite which had been subjected to finish annealing (grain-oriented electrical steel sheet with a base film).

As described above, a grain-oriented electrical steel sheet with a base film in which Sr and Ca were contained in a total amount of 0.0043 pts.mass with respect to the grain-oriented electrical steel sheet with a base film in an amount of 100 pts.mass (grain-oriented electrical steel sheet with a base film D) was obtained.

Subsequently, after light pickling in 5 mass % phosphoric acid had been performed on the grain-oriented electrical steel sheet with a base film D obtained as described above, the treatment agent for forming an insulating film A or the treatment agent for forming an insulating film B described above was applied to the pickled steel sheet so that the total coating weight was 8 g/$m^2$ on both sides of the steel sheet after having been baked. Subsequently, the steel sheet, to which the treatment agent for forming an insulating film had been applied, was subjected to flattening annealing and a heat treatment of a tension film (at a baking temperature T of 850° C. for a baking time at the baking temperature T of 60 seconds in a $N_2$ atmosphere). Here, when heating was performed to the baking temperature described above, the average heating rate V in a temperature range of 50° C. to 200° C. was 25° C./s, and the dew-point temperature DP of the furnace in a temperature range of 50° C. to 200° C. was −25° C.

The film structure, adhesion property of an insulated film, and tension applied to the steel sheet (film tension) of each of the samples of the grain-oriented electrical steel sheets with an insulating film obtained as described above were investigated. The evaluation results are given in Table 3. The FIGURE shows the measurement results of the concentration distributions of Sr and Ca of sample No. 2-1 in Table 3 (here, since sample No. 2-1 did not contain Ba, the measurement result of the concentration distribution of Ba is not shown in the FIGURE). Here, the time (sec) in Table 3 and the FIGURE corresponds to a distance in the depth direction (thickness direction) from position x(0).

TABLE 3

| No. | Grain-oriented Electrical Steel Sheet with Base Film | Treatment Agent for Forming Insulating Film | Film Structure*11 | | | | | |
|---|---|---|---|---|---|---|---|---|
| 2-1 | D | A | x(N/2) [sec] | x(N + M/2) [sec] | x(Sr(C)) [sec] | Sr(A)*1 [V] | Sr(B)*2 [V] | Sr(C)*3 [V] |
| | | | 9 | 34 | 28 | 0.65 | 1.33 | 5.11 |
| | | | | | x(Ca(C)) [sec] | Ca(A)*4 [V] | Ca(B)*5 [V] | Ca(C)*6 [V] |
| | | | | | 26 | 1.30 | 1.65 | 2.44 |
| | | | | | x(Ba(C))*7 [sec] | Ba(A)*8 [V] | Ba(B)*9 [V] | Ba(C)*10 [V] |
| | | | | | — | 0 | 0 | 0 |
| 2-2 | D | B | x(N/2) [sec] | x(N + M/2) [sec] | x(Sr(C)) [sec] | Sr(A)*1 [V] | Sr(B)*2 [V] | Sr(C)*3 [V] |
| | | | 9 | 32 | 25 | 0.58 | 1.25 | 5.23 |
| | | | | | x(Ca(C)) [sec] | Ca(A)*4 [V] | Ca(B)*5 [V] | Ca(C)*6 [V] |
| | | | | | 23 | 1.35 | 1.75 | 2.39 |
| | | | | | x(Ba(C))*7 [sec] | Ba(A)*8 [V] | Ba(B)*9 [V] | Ba(C)*10 [V] |
| | | | | | — | 0 | 0 | 0 |

| No. | Film Structure*11 | | | Adhesion Property Number of Peeling (—) | Film Tension (MPa) | Note |
|---|---|---|---|---|---|---|
| 2-1 | x(N/2) < x(Sr(C)) ≤ x(N + M/2) | Sr(C) > Sr(B) | Sr(B) ≥ Sr(A) ≥ 0 | 1 | 8.2 | Example |
| | ○ | ○ | ○ | | | |
| | x(N/2) < x(Ca(C)) ≤ x(N + M/2) | Ca(C) > Ca(B) | Ca(B) ≥ Ca(A) ≥ 0 | | | |
| | ○ | ○ | ○ | | | |
| | x(N/2) < x(Ba(C)) ≤ x(N + M/2) | Ba(C) > Ba(B) | Ba(B) ≥ Ba(A) ≥ 0 | | | |
| | x | x | ○ | | | |
| 2-2 | x(N/2) < x(Sr(C)) ≤ x(N + M/2) | Sr(C) > Sr(B) | Sr(B) ≥ Sr(A) ≥ 0 | 0 | 8.0 | Example |
| | ○ | ○ | ○ | | | |
| | x(N/2) < x(Ca(C)) ≤ x(N + M/2) | Ca(C) > Ca(B) | Ca(B) ≥ Ca(A) ≥ 0 | | | |
| | ○ | ○ | ○ | | | |
| | x(N/2) < x(Ba(C)) ≤ x(N + M/2) | Ba(C) > Ba(B) | Ba(B) ≥ Ba(A) ≥ 0 | | | |
| | x | x | ○ | | | |

*1 maximum Sr concentration (spectral intensity) in a region from position x(0) to position x(N/2)
*2 Sr concentration (spectral intensity) at position x(N)
*3 maximum Sr concentration (spectral intensity) in a thickness region formed by combining the insulating film and the base film
*4 maximum Ca concentration (spectral intensity) in a region from position x(0) to position x(N/2)
*5 Ca concentration (spectral intensity) at position x(N)
*6 maximum Ca concentration (spectral intensity) in a thickness region formed by combining the insulating film and the base film
*7 containing no Ba
*8 maximum Ba concentration (spectral intensity) in a region from position x(0) to position x(N/2)
*9 Ba concentration (spectral intensity) at position x(N)
*10 maximum Ba concentration (spectral intensity) in a thickness region formed by combining the insulating film and the base film
*11 A case conforming to the inequality in the table is denoted by "○", and a case non-conforming to the inequality is denoted by "x".

As indicated in Table 3, in the case where an insulating film is formed by baking a treatment agent for forming an insulating film such that at least one of condition 1, condition 2, and condition 3 below was satisfied by the maximum Sr concentration (Sr(A)), the maximum Ca concentration (Ca(A)), and the maximum Ba concentration (Ba(A)) in a region from position x(0) to position x(N/2), the Sr concentration (Sr(B)), the Ca concentration (Ca(B)), and the Ba concentration (Ba(B)) at position x(N), the maximum Sr concentration (Sr(C)), the maximum Ca concentration (Ca (C)), the maximum Ba concentration (Ba(C)) in a thickness region formed by combining the insulating film and the base film, and positions x(Sr(C)), x(Ca(C)), and x(Ba(C)) at which values Sr(C), Ca(C), and Ba(C) described above are taken, respectively, while the relational expressions Sr(B) Sr(A) 0, Ca(B) Ca(A) 0, and Ba(B) Ba(A) 0 were satisfied, a film tension of 8.0 MPa or more was achieved, and an insulating film having an improved adhesion property represented by a number of peeling of 1 or less was obtained.

$x(N/2)<x(Sr(C))\leq x(N+M/2)$ and $Sr(C)>Sr(B)$ [Condition 1]

$x(N/2)<x(Ca(C))\leq x(N+M/2)$ and $Ca(C)>Ca(B)$ [Condition 2]

$x(N/2)<x(Ba(C))\leq x(N+M/2)$ and $Ba(C)>Ba(B)$ [Condition 3]

Example 2

A grain-oriented electrical steel sheet with a base film (grain-oriented electrical steel sheet with a base film E) was prepared by using the same method used in Example 1 with the exception that an annealing separator containing $TiO_2$ in an amount of 5 pts.mass, $SrSO_4$ in an amount of 5 pts.mass, and $CaSO_4$ in an amount of 0.3 pts.mass with respect to MgO in an amount of 100 pts.mass was used as the annealing separator. The grain-oriented electrical steel sheet with a base film E contained Sr and Ca in a total amount of 0.0041 pts.mass with respect to the grain-oriented electrical steel sheet with a base film in an amount of 100 pts.mass.

Subsequently, after light pickling in 5 mass % phosphoric acid had been performed on the grain-oriented electrical steel sheet with a base film E obtained as described above, one of the treatment agents for forming an insulating film F to I described below was applied to the pickled steel sheet so that the total coating weight was 8 g/m$^2$ on both sides of the steel sheet after having been baked, heating was thereafter performed at an average heating rate V of 25° C./s in a temperature range of 50° C. to 200° C. in an atmosphere having the dew-point temperature DP of the furnace of −25° C. in the temperature range of 50° C. to 200° C., and baking was thereafter performed at a baking temperature T of 850° C. for 30 seconds in a $N_2$ atmosphere.

(Treatment agents for forming an insulating film F to I) A treatment agent which contained a colloidal silica in the amounts given in Table 4 (in terms of $SiO_2$ solid content), and $CrO_3$ in an amount of 25 pts.mass with respect to the metal phosphates given in Table 4 in an amount of 100 pts.mass (in terms of solid content), and which contained substantially no Sr, Ca, or Ba The film structure, adhesion property of an insulating film, and tension applied to the steel sheet (film tension) of each of the samples of the grain-oriented electrical steel sheets with an insulating film obtained as described above were investigated. The evaluation results are given in Table 4. Here, the time (sec) in Table 4 corresponds to a distance in the depth direction (thickness direction) from position x(0).

TABLE 4

| No. | Grain-oriented Electrical Steel Sheet with Base Film | Treatment Agent for Forming Insulating Film | Mg Primary Phosphate [pts · mass] | Al Primary Phosphate [pts · mass] | Colloidal Silica [pts · mass] | Film Structure*11 | | | |
|---|---|---|---|---|---|---|---|---|---|
| 3-1 | E | F | 100 | — | 50 | x(N/2)<br>[sec]<br>9 | x(N + M/2)<br>[sec]<br>33 | x(Sr(C))<br>[sec]<br>25<br>x(Ca(C))<br>[sec]<br>26<br>x(Ba(C))*7<br>[sec]<br>— | Sr(A)*1<br>[V]<br>0.68<br>Ca(A)*4<br>[V]<br>1.32<br>Ba(A)*8<br>[V]<br>0 |
| 3-2 | E | G | 60 | 40 | 120 | x(N/2)<br>[sec]<br>9 | x(N + M/2)<br>[sec]<br>32 | x(Sr(C))<br>[sec]<br>23<br>x(Ca(C))<br>[sec]<br>23<br>x(Ba(C))*7<br>[sec]<br>— | Sr(A)*1<br>[V]<br>0.72<br>Ca(A)*4<br>[V]<br>1.34<br>Ba(A)*8<br>[V]<br>0 |
| 3-3 | E | H | 100 | — | 200 | x(N/2)<br>[sec]<br>8 | x(N + M/2)<br>[sec]<br>34 | x(Sr(C))<br>[sec]<br>25<br>x(Ca(C))<br>[sec]<br>20<br>x(Ba(C))*7<br>[sec]<br>— | Sr(A)*1<br>[V]<br>0.57<br>Ca(A)*4<br>[V]<br>1.32<br>Ba(A)*8<br>[V]<br>0 |
| 3-4 | E | I | 100 | — | 205 | x(N/2)<br>[sec]<br>9 | x(N + M/2)<br>[sec]<br>33 | x(Sr(C))<br>[sec]<br>27<br>x(Ca(C))<br>[sec]<br>25<br>x(Ba(C))*7<br>[sec]<br>— | Sr(A)*1<br>[V]<br>0.58<br>Ca(A)*4<br>[V]<br>1.30<br>Ba(A)*8<br>[V]<br>0 |

| No. | Film Structure*11 | | | | | Adhesion Property Number of Peeling (—) | Film Tension (MPa) | Note |
|---|---|---|---|---|---|---|---|---|
| 3-1 | Sr(B)*2<br>[V]<br>1.30 | Sr(C)*3<br>[V]<br>5.10 | x(N/2) < x(Sr(C)) ≤ x(N + M/2)<br>○ | Sr(C) > Sr(B)<br>○ | Sr(B) ≥ Sr(A) ≥ 0<br>○ | 0 | 8.0 | Example |

TABLE 4-continued

| | | | | | | | | |
|---|---|---|---|---|---|---|---|---|
| | Ca(B)*5 | Ca(C)*6 | x(N/2) < x(Ca(C)) ≤ | Ca(C) > | Ca(B) ≥ | | | |
| | [V] | [V] | x(N + M/2) | Ca(B) | Ca(A) ≥ 0 | | | |
| | 1.66 | 2.04 | ○ | ○ | ○ | | | |
| | Ba(B)*9 | Ba(C)*10 | x(N/2) < x(Ba(C)) ≤ | Ba(C) > | Ba(B) ≥ | | | |
| | [V] | [V] | x(N + M/2) | Ba(B) | Ba(A)≥ 0 | | | |
| | 0 | 0 | x | x | ○ | | | |
| 3-2 | Sr(B)*2 | Sr(C)*3 | x(N/2) < x(Sr(C)) ≤ | Sr(C) > | Sr(B) ≥ | 1 | 8.7 | Example |
| | [V] | [V] | x(N + M/2) | Sr(B) | Sr(A) ≥ 0 | | | |
| | 1.25 | 4.89 | ○ | ○ | ○ | | | |
| | Ca(B)*5 | Ca(C)*6 | x(N/2) < x(Ca(C)) ≤ | Ca(C) > | Ca(B) ≥ | | | |
| | [V] | [V] | x(N + M/2) | Ca(B) | Ca(A) ≥ 0 | | | |
| | 1.70 | 2.11 | ○ | ○ | ○ | | | |
| | Ba(B)*9 | Ba(C)*10 | x(N/2) < x(Ba(C)) ≤ | Ba(C) > | Ba(B) ≥ | | | |
| | [V] | [V] | x(N + M/2) | Ba(B) | Ba(A) ≥ 0 | | | |
| | 0 | 0 | x | x | ○ | | | |
| 3-3 | Sr(B)*2 | Sr(C)*3 | x(N/2) < x(Sr(C)) ≤ | Sr(C) > | Sr(B) ≥ | 0 | 8.5 | Example |
| | [V] | [V] | x(N + M/2) | Sr(B) | Sr(A) ≥ 0 | | | |
| | 1.28 | 4.92 | ○ | ○ | ○ | | | |
| | Ca(B)*5 | Ca(C)*6 | x(N/2) < x(Ca(C)) ≤ | Ca(C) > | Ca(B) ≥ | | | |
| | [V] | [V] | x(N + M/2) | Ca(B) | Ca(A) ≥ 0 | | | |
| | 1.72 | 1.80 | ○ | ○ | ○ | | | |
| | Ba(B)*9 | Ba(C)*10 | x(N/2) < x(Ba(C)) ≤ | Ba(C) > | Ba(B) ≥ | | | |
| | [V] | [V] | x(N + M/2) | Ba(B) | Ba(A)≥ 0 | | | |
| | 0 | 0 | x | x | ○ | | | |
| 3-4 | Sr(B)*2 | Sr(C)*3 | x(N/2) < x(Sr(C)) ≤ | Sr(C) > | Sr(B) ≥ | 2 | 8.1 | Example |
| | [V] | [V] | x(N + M/2) | Sr(B) | Sr(A) ≥ 0 | | | |
| | 1.25 | 5.02 | ○ | ○ | ○ | | | |
| | Ca(B)*5 | Ca(C)*6 | x(N/2) < x(Ca(C)) ≤ | Ca(C) > | Ca(B) ≥ | | | |
| | [V] | [V] | x(N + M/2) | Ca(B) | Ca(A) ≥ 0 | | | |
| | 1.68 | 1.95 | ○ | ○ | ○ | | | |
| | Ba(B)*9 | Ba(C)*10 | x(N/2) < x(Ba(C)) ≤ | Ba(C) > | Ba(B) ≥ | | | |
| | [V] | [V] | x(N + M/2) | Ba(B) | Ba(A) ≥ 0 | | | |
| | 0 | 0 | x | x | ○ | | | |

*1 maximum Sr concentration (spectral intensity) in a region from position x(0) to position x(N/2)
*2 Sr concentration (spectral intensity) at position x(N)
*3 maximum Sr concentration (spectral intensity) in a thickness region formed by combining the insulating film and the base film
*4 maximum Ca concentration (spectral intensity) in a region from position x(0) to position x(N/2)
*5 Ca concentration (spectral intensity) at position x(N)
*6 maximum Ca concentration (spectral intensity) in a thickness region formed by combining the insulating film and the base film
*7 containing no Ba
*8 maximum Ba concentration (spectral intensity) in a region from position x(0) to position x(N/2)
*9 Ba concentration (spectral intensity) at position x(N)
*10 maximum Ba concentration (spectral intensity) in a thickness region formed by combining the insulating film and the base film
*11 A case conforming to the inequality in the table is denoted by "○", and a case non-conforming to the inequality is denoted by "x".

As indicated in Table 4, in the case where an insulating film was formed by using a treatment agent for forming an insulating film containing a colloidal silica in an amount of 50 pts.mass or more and 200 pts.mass or less in terms of $SiO_2$ solid content with respect to a metal phosphate in an amount of 100 pts.mass in terms of solid content, a good film adhesion property represented by a number of peeling of 1 or less was achieved, and a high film tension of 8.0 MPa or more was achieved. In particular, in the case of No. 3-2 and No. 3-3 where insulating films were formed by using treatment agents for forming an insulating film containing a colloidal silica in an amount of 120 pts.mass or more and 200 pts.mass or less in terms of $SiO_2$ solid content with respect to a metal phosphate in an amount of 100 pts.mass in terms of solid content, a higher film tension of 8.5 MPa or more was achieved.

The invention claimed is:

1. A grain-oriented electrical steel sheet with an insulating film, the steel sheet comprising a base film composed mainly of forsterite on a surface of a grain-oriented electrical steel sheet and an insulating film containing mainly silicate-phosphate glass which is formed on a surface of the base film, wherein at least one of condition 1, condition 2, and condition 3 below is satisfied, and relational expressions Sr(B)≥Sr(A)≥0, Ca(B)≥Ca(A)≥0, and Ba(B)≥Ba(A)≥0 are satisfied, where a thickness of the insulating film is defined as N and a thickness of the base film is defined as M, where, in a thickness direction from a surface of the insulating film, a position of the surface of the insulating film is defined as x(0), a central position of the thickness of the insulating film is defined as x(N/2), a position of an interface between the insulating film and the base film is defined as x(N), and a central position of the thickness of the base film is defined as x(N+M/2), where maximum values of a Sr concentration, a Ca concentration, and a Ba concentration in a region from the position x(0) to the position x(N/2) are defined as Sr(A), Ca(A), and Ba(A), respectively, and a Sr concentration, a Ca concentration, and a Ba concentration at the position x(N) are defined as Sr(B), Ca(B), and Ba(B), respectively, and where maximum values of a Sr concentration, a Ca concentration, and a Ba concentration in a thickness region formed by combining the insulating film and the base film are defined as Sr(C), Ca(C), and Ba(C), respectively, and positions at which the values Sr(C), Ca(C), and Ba(C) are taken are defined as x(Sr(C)), x(Ca(C)), and x(Ba(C)), respectively:

$$x(N/2)<x(Sr(C))\leq x(N+M/2) \text{ and } Sr(C)>Sr(B) \quad \text{[Condition 1]}$$

$$x(N/2)<x(Ca(C))\leq x(N+M/2) \text{ and } Ca(C)>Ca(B) \quad \text{[Condition 2]}$$

$$x(N/2)<x(Ba(C))\leq x(N+M/2) \text{ and } Ba(C)>Ba(B) \quad \text{[Condition 3].}$$

2. A method for manufacturing the grain-oriented electrical steel sheet with an insulating film according to claim 1, the method comprising applying a treatment agent for forming an insulating film, the treatment agent containing mainly a metal phosphate and a colloidal silica and containing substantially no Sr, Ca, or Ba, to the surface of the grain-oriented electrical steel sheet having been subjected to finish annealing and having the base film composed mainly of forsterite on the surface thereof, the base film containing at least one of Sr, Ca, and Ba, thereafter heating the steel sheet at an average heating rate of 20° C./s or higher and 40° C./s or lower in an atmosphere having a dew-point temperature of −30° C. or higher and −15° C. or lower in a temperature range of 50° C. to 200° C., and thereafter baking the steel sheet at a baking temperature of 800° C. or higher and 1000° C. or lower to form the insulating film on the surface of the base film.

3. The method for manufacturing the grain-oriented electrical steel sheet with an insulating film according to claim 2, wherein the treatment agent for forming an insulating film contains a colloidal silica in an amount of 50 pts.mass to 200 pts.mass in terms of $SiO_2$ solid content with respect to a metal phosphate in an amount of 100 pts.mass in terms of solid content.

* * * * *